United States Patent [19]

Hirabayashi et al.

[11] Patent Number: 6,101,282
[45] Date of Patent: Aug. 8, 2000

[54] APPARATUS AND METHOD FOR IMAGE DATA ENCODING

[75] Inventors: Yasuji Hirabayashi, Kawasaki; Tadashi Yoshida, Ichikawa; Hiroshi Kajiwara, Inagi, all of Japan

[73] Assignee: Canon Kabushiki Kaisha, Tokyo, Japan

[21] Appl. No.: 08/665,953

[22] Filed: Jun. 19, 1996

[30] Foreign Application Priority Data

Jun. 22, 1995 [JP] Japan .................................. 7-156135
Jul. 14, 1995 [JP] Japan .................................. 7-178695

[51] Int. Cl.$^7$ .................................................. G06K 9/36
[52] U.S. Cl. ........................ 382/246; 382/232; 348/397; 348/420
[58] Field of Search ................................. 382/232, 246, 382/242, 264; 348/387, 385, 411, 396, 407, 409, 402, 397, 398, 415, 420; 386/116, 123; 341/178; 358/261.1

[56] References Cited

U.S. PATENT DOCUMENTS

| | | | |
|---|---|---|---|
| 4,205,341 | 5/1980 | Mitsuya et al. | 348/420 |
| 4,215,374 | 7/1980 | Mizuno | 358/260 |
| 4,743,959 | 5/1988 | Fredericksen | 348/396 |
| 4,922,340 | 5/1990 | Iwai | 358/135 |
| 4,937,681 | 6/1990 | Fujinawa et al. | 358/426 |
| 4,939,583 | 7/1990 | Tsuboi et al. | 358/261.1 |
| 5,057,918 | 10/1991 | Denoyelle et al. | 348/402 |
| 5,274,719 | 12/1993 | Taniguchi et al. | 382/56 |
| 5,299,025 | 3/1994 | Shirasawa | 358/400 |
| 5,317,411 | 5/1994 | Yoshida | 358/261.2 |
| 5,321,725 | 6/1994 | Paik et al. | 375/265 |
| 5,412,428 | 5/1995 | Tahara | 348/396 |
| 5,546,477 | 8/1996 | Knowles et al. | 382/242 |
| 5,550,590 | 8/1996 | Sakazawa et al. | 348/387 |
| 5,561,464 | 10/1996 | Park | 348/397 |
| 5,644,660 | 7/1997 | Bruder | 382/232 |
| 5,650,822 | 7/1997 | Heisler et al. | 348/402 |

FOREIGN PATENT DOCUMENTS

| | | | |
|---|---|---|---|
| 220706 | 5/1987 | European Pat. Off. | H04N 1/41 |
| 269746 | 6/1988 | European Pat. Off. | H04N 1/00 |
| 442054 | 8/1991 | European Pat. Off. | H04N 1/40 |
| 0504903 A2 | 9/1992 | European Pat. Off. | H04N 1/41 |
| 0523939 A2 | 1/1993 | European Pat. Off. | H04N 1/46 |
| 63-117564 | 5/1988 | Japan | H04N 1/419 |

OTHER PUBLICATIONS

H. Gharavi et al., "CCITT Compatible Coding of Multilevel Pictures," Bell System Tech. J., vol. 62, No. 9, Nov. 1983, pp. 2765–2778.
K. Wong et al., "Document Analysis System," IBM J. Research and Development, vol. 26, No. 6, Nov. 1982, pp. 647–656.
M. Kunt et al., "Block coding of graphics: A Tutorial Review," Proc. IEEE, vol. 68, No. 7, Jul. 1980, pp. 770–786.
Jacques Vaisey, et al., "Image Compression with Variable Block Size Segmentation", IEEE Transactions on Signal Processing, vol. 40, No. 8, Aug. 1992, pp. 2040–2060.
Ken Knowlton, "Progressive Transmission of Grey–Scale and Binary Pictures by Simple, Efficient, and Lossless Encoding Schemes", Proceedings of the IEEE, vol. 68, No. 7, Jul. 1980, pp. 885–897.

*Primary Examiner*—Jose L. Couso
*Assistant Examiner*—Anh Hong Do
*Attorney, Agent, or Firm*—Fitzpatrick Cella Harper & Scinto

[57] ABSTRACT

An image processing apparatus entropy encodes plural encoding target data by using a first entropy encoding table to provide respective data amounts of plural encoded data and compares the data amounts of plural encoded data with each other. One of the plural encoding target data is selected according to the result of the comparison and a second entropy encoding table is produced according to the content of the selected encoding target data. The apparatus then entropy encodes the selected encoding target data utilizing the second entropy encoding table.

18 Claims, 12 Drawing Sheets

| NO. | ENCODE METHOD |
|---|---|
| #0 | a + b − c |
| #1 | b |
| #2 | a |
| #3 | b + (a − c)/2 |
| #4 | a + (b − c)/2 |
| #5 | (a + b + c)/3 |
| #6 | PLANE APPROXIMATION MODE |
| #7 | UNIFORM MODE |
| #8 | BINARY MODE |

HUFFMAN TABLE BEING COMMON IN EACH BLOCK SIZE (#0–#6)

FIG. 4A
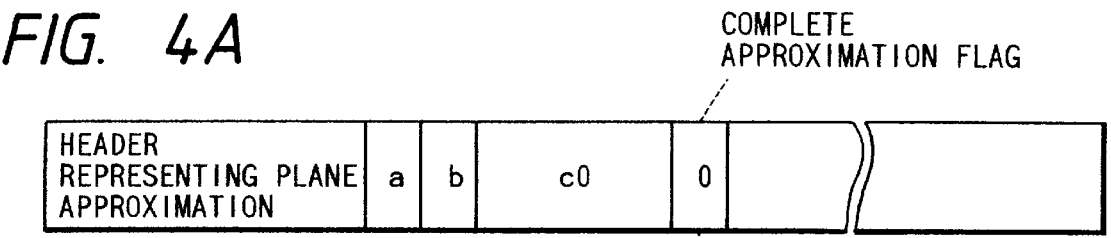
FIG. 4B
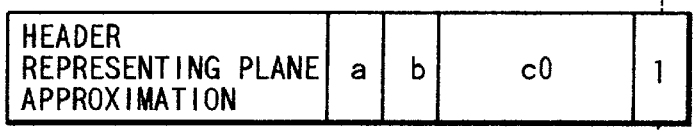
FIG. 4C
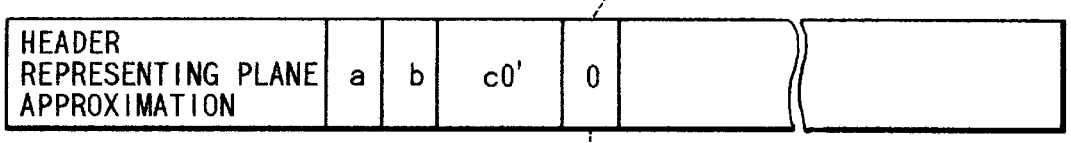
FIG. 4D
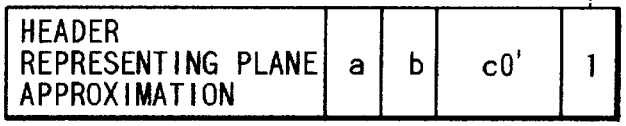
FIG. 4E
| VALUE | CODE | | | CODE LENGTH |
|---|---|---|---|---|
| 0 | 0 | | | 1 |
| 1 | 100S | | | |
| 2 | 101S | | | 4 |
| 3 | 110S | | | |
| 4 | 1110 | 00S | | |
| 5 | 1110 | 01S | | |
| 6 | 1110 | 10S | | |
| 7 | 1110 | 11S | | 7 |
| 8 | 1111 | 00S | | |
| 9 | 1111 | 01S | | |
| 10 | 1111 | 10S | | |
| 11 | 1111 | 1100 | S | |
| 12 | 1111 | 1101 | S | 9 |
| 13 | 1111 | 1110 | S | |
| ESC | 1111 | 1111 | | 8 + 8 |
c0' HUFFMAN TABLE FIG. 5A
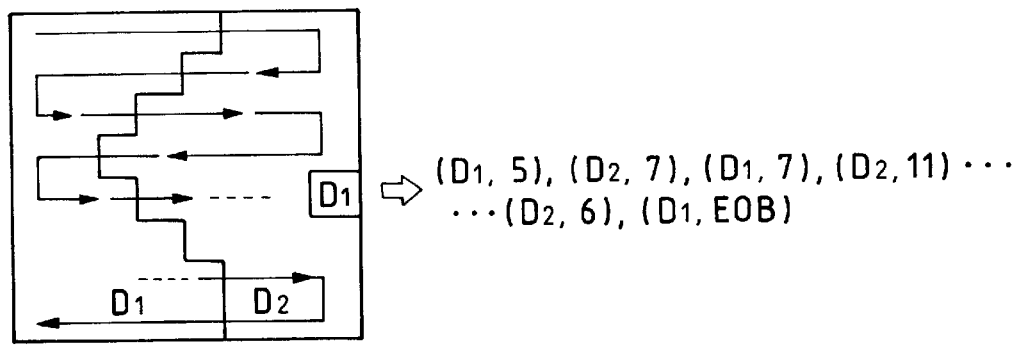
FIG. 5B
BINARY MODE RUN LENGTH TABLE
| TERMINATING CODE | MAKE-UP CODE |
|---|---|
| 0 | 128 |
| $\vert$ | 256 |
|  | 512 |
|  | 1024 |
|  | 2048 |
| 127 | 4096 |
| EOB | 8196 |
*EOB: END OF BLOCK
FIG. 6
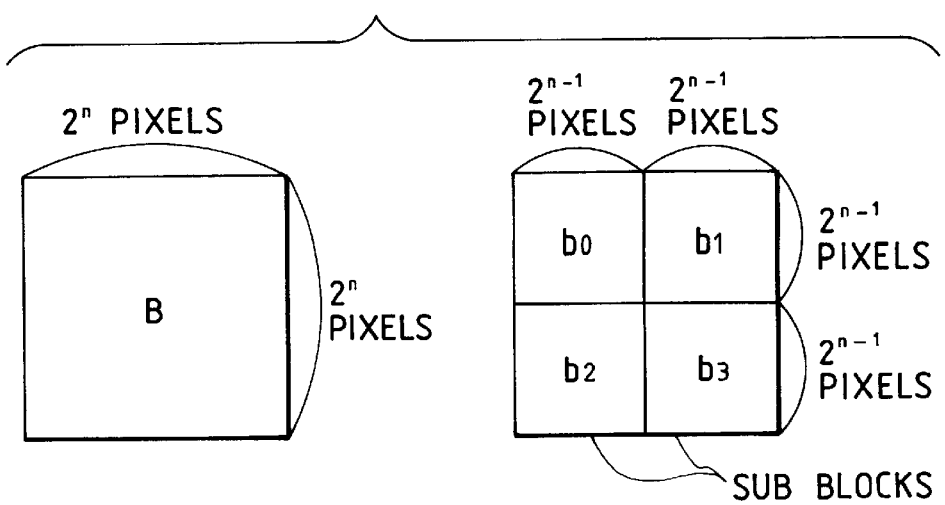

EXAMPLE OF ENCODE TARGET BLOCK DIVISION

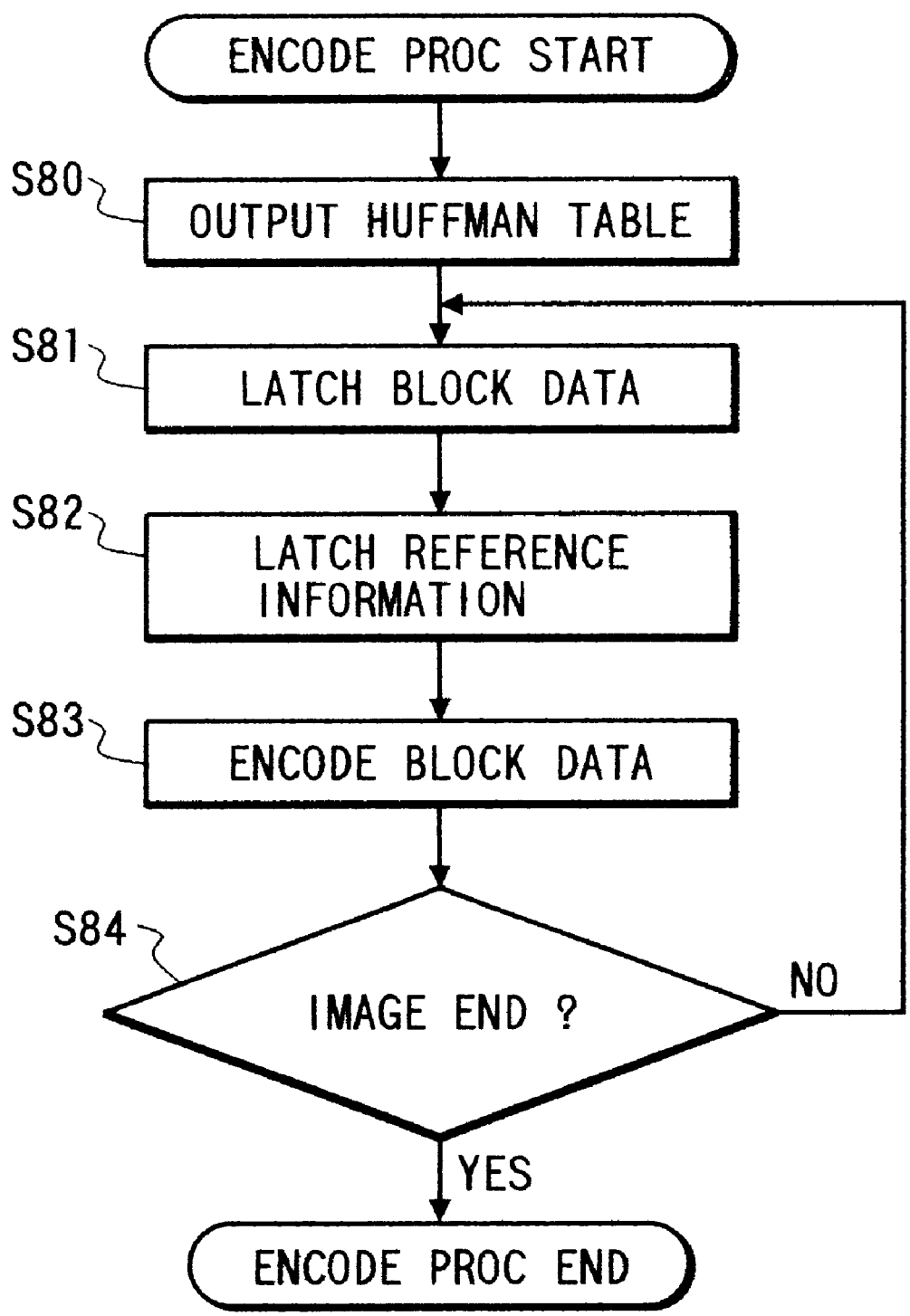

APPARATUS AND METHOD FOR IMAGE DATA ENCODING

BACKGROUND OF THE INVENTION

1. Field of the Invention

The present invention relates to an image processing apparatus for processing an image, a data processing apparatus and a method therefor.

2. Related Background Art

For reversible encoding of a multi-value image, there is already known DPCM (differential pulse code modulation). In general, the encoding by DPCM is achieved by calculating the predicted value (plane prediction) of an encoding target pixel, utilizing already encoded pixels around the encoding target pixel, for example a pixel (value a) at the left side, a pixel (value b) at the upper side and a pixel (value c) at the upper left position, for example according to a calculation formula (a+b−c), and encoding the difference between thus calculated predicted value and the value of the encoding target pixel.

The multi-value gradation image, represented by image data obtained scanning a natural image such as a photograph, show significant difference in the statistical property depending on the position within the image. Such statistical difference arises from the difference in the local image structure, such as the presence of an edge in the image or the direction of inclination of the luminance.

The above-mentioned prediction of the pixel value according to the DPCM method is only effective, among such local structures, for those that can be approximated partially to a two-dimensional plane, and is detrimental to other structures because of an increase in the dynamic range.

For complementing such encoding method, there can be conceived an encoding method of effecting the encoding in the unit of a block, employing an encoding method effective for the structure prevailing in the block and attaching an index, indicating such encoding method, as additional information.

However the local structure within the image generally occupies a large area in a flat (low frequency structure) portion but becomes as small as several pixels in an edge portion or a fine line portion with steep change in the luminance.

Consequently, in case of encoding in the unit of a block, a larger block size is more efficient in such flat portion and a smaller block size is more efficient in the fine structure portion.

However, even such flat portion may have a complex shape, and even the high frequency structure may extend uniformly over a wire area. Conventionally it has not been possible to effect encoding with the optimum encoding method, utilizing the optimum encoding unit according to the property of the image as explained above.

Also in case of switching the encoding method in the unit of a block, there is conventionally conducted the Huffman encoding, utilizing a predetermined Huffman table for all the blocks. Consequently the efficiency of encoding is undesirably low, as the encoding with optimum entropy cannot be executed for each of the encoding methods used for such encoding block units.

SUMMARY OF THE INVENTION

In consideration of the foregoing, an object of the present invention is to enable encoding with an optimum encoding method in an optimum encoding unit, according to the property of the image.

The above-mentioned object can be attained, according to a preferred embodiment of the present invention, by an image processing apparatus comprising:

division means for dividing an image into plural encoding target blocks;

selection means for selecting one of plural encoding modes, prepared in advance, for use in each of the encoding target blocks divided by said division means; and encoding means for encoding each encoding target block with the encoding mode selected by said selection means;

wherein the division by said division means enables presence of the encoding target blocks of different sizes within said image.

Another object of the present invention is to enable more efficient encoding than in the prior technology, in the encoding in the unit of a block.

Still another object of the present invention is, in encoding the target data by switching the encoding method for each of the block units, to effect entropy encoding according to each of the encoding methods to be used for each block unit.

Still other objects of the present invention, and the features thereof, will become fully apparent from the following description of the embodiments, to be taken in conjunction with the attached drawings.

BRIEF DESCRIPTION OF THE DRAWINGS

FIGS. 4A to 4E are views showing encoded data formats in the encoding methods #6 and #7, and a Huffman table for c0' employed in such encoding methods;

FIGS. 5A and 5B are respectively a view showing the scanning method within a block in the binary encoding method and the encoded data format, and a view showing a run length list employed in the binary encoding;

FIG. 6 is a view showing a square block and sub blocks thereof;

FIG. 9 is a flow chart showing the encoding process in a step S9;

DETAILED DESCRIPTION OF THE PREFERRED EMBODIMENTS

Now a first embodiment of the present invention will be explained with reference to FIGS. 1 and 2.

Figure 1:
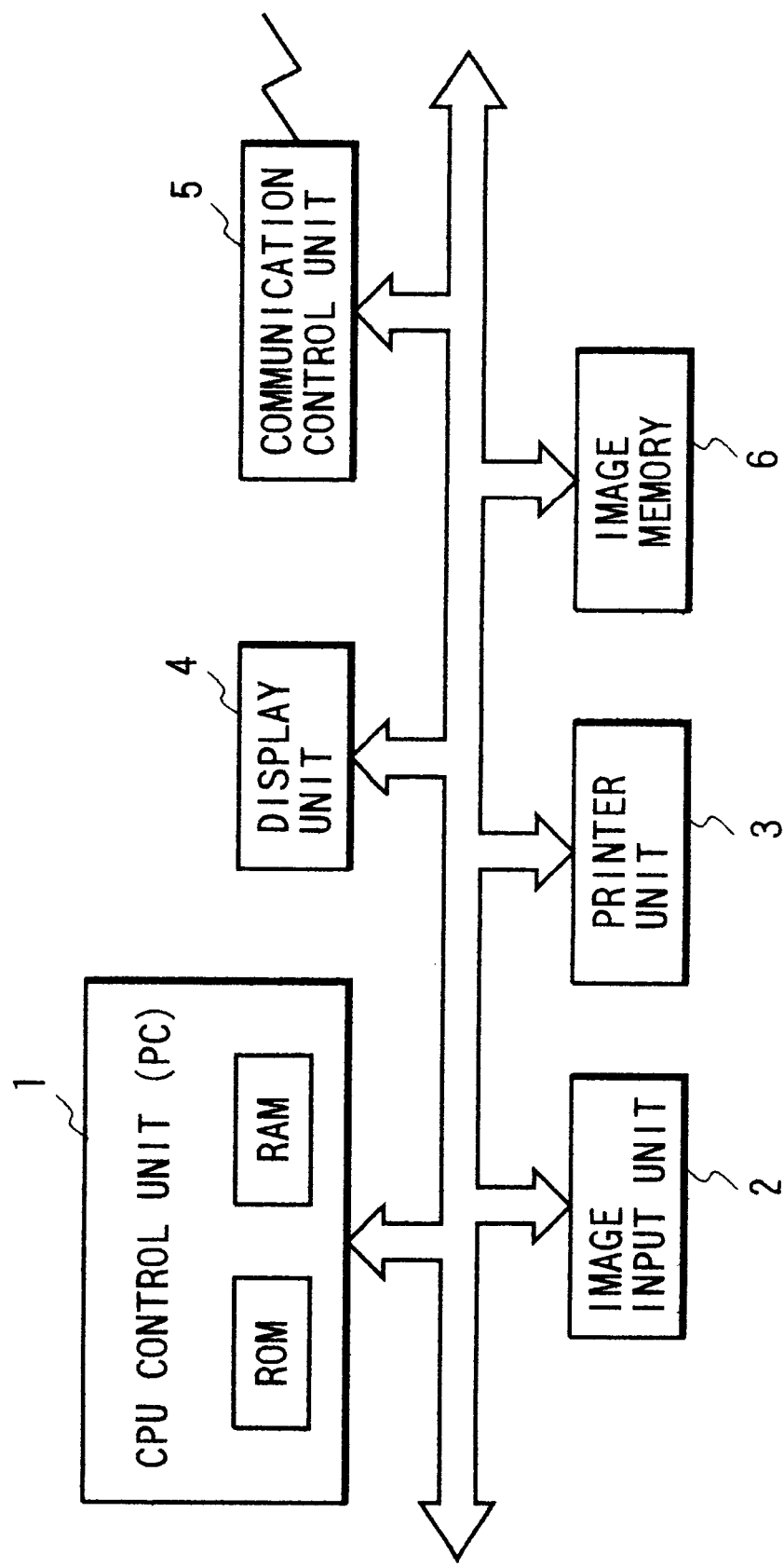
FIG. 1 is a block diagram of an apparatus constituting a first embodiment.

FIG. 1 shows the circuit structure for encoding and decoding an image, wherein provided are a CPU control unit 1 capable of encoding and decoding of the image data by a software process; an image input unit 2 for fetching the image data; a printer unit 3 for printing the image data; a display unit 4 for displaying the image data for example on a monitor; a communication control unit 5 for transmitting the data encoded in the CPU control unit 1 or receiving encoded data transmitted from an external equipment; and an image memory 6.

At first the image data (assumed to be luminance image data of 8 bits in gradation) entered from the image input unit 1 are stored in the image memory 6.

Figure 2:
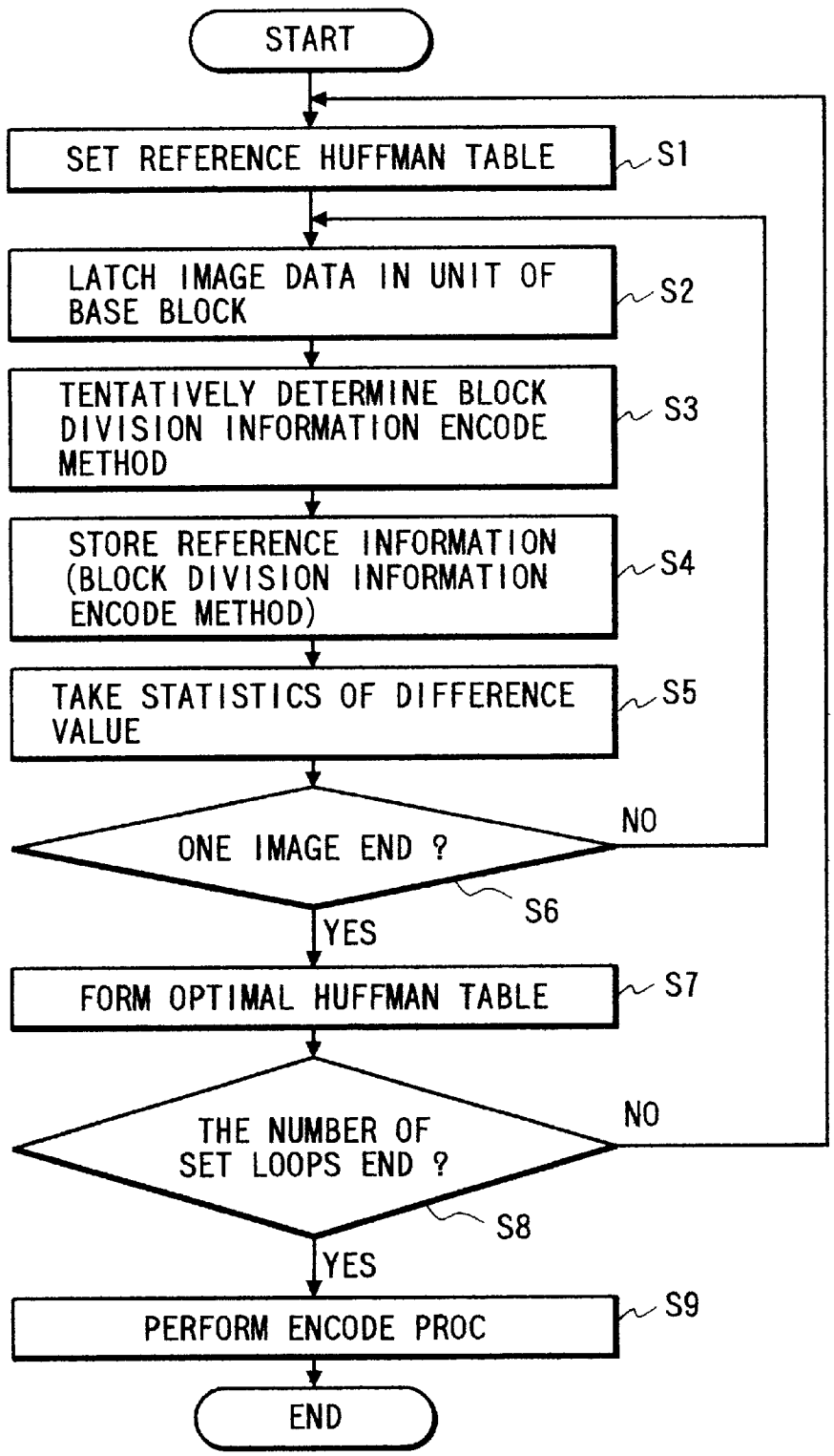
FIG. 2 is a flow chart showing the control sequence of the first embodiment.

Then the CPU control unit 1 effects encoding of the image data in the image memory 6, by effecting a software process as indicated by a flow chart in FIG. 2.

The encoding is conducted in the unit of a square block, with a base block size of 128×128 pixels and a minimum block size of 4×4 pixels, and is executed with a variation in the block size.

Prior to the explanation of the processes in the steps shown in FIG. 2, there will be explained plural encoding methods available for each block unit of the image in the present embodiment.

Figures 3A, 3B:
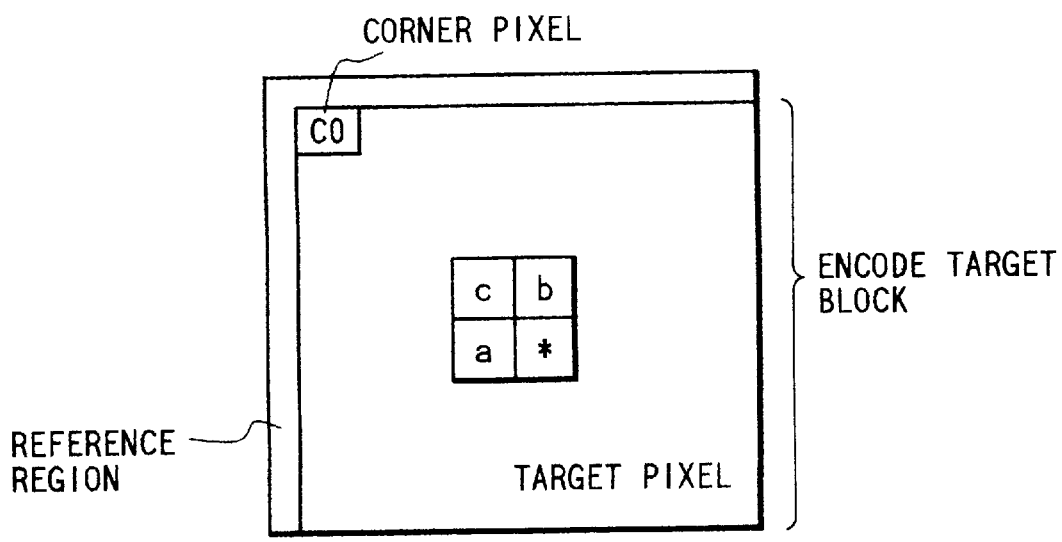
FIGS. 3A and 3B are views for explaining the encoding method employed in the first embodiment.

For a target pixel * in an encoding unit block (4×4, 8×8, 16×16, 32×32, 64×64 or 128×128 pixels in the present embodiment), surrounding pixels a, b, c are defined as shown in FIG. 3A. Also the value of the pixel at the upper left corner of the encoding unit block is defined as c0.

The encoding methods in the present embodiment can be represented as shown in FIG. 3B, utilizing the pixels explained above.

There are provided nine encoding methods in total, in which six methods #0–#5 are prediction encoding methods in which the difference (prediction error) from the surrounding pixels is encoded with Huffman codes to be explained later.

A same Huffman table is used for the encoding methods #0–#5 if for a same block size, but, the Huffman table is varied according to the block size, as the statistics for the prediction error also vary depending on the block size. Consequently, in the present embodiment, there are prepared 6 Huffman tables in total, corresponding to the blocks of 4×4, . . . 128×128 pixels.

In the following there will be explained an encoding method #6 of "plane approximation mode".

In the block shown in FIG. 3A, the position of the pixel c0 is assumed to have a three-dimensional coordinate (0, 0, c0), and the x-axis is taken in a direction to the right (main scanning direction) while the y-axis is taken in a downward direction (sub scanning direction). The z-axis indicates the value of the pixel.

Then approximation is made as a plane (z=c0+ax+by) by determining the square error in the z-direction for all the pixel values within the encoding unit block, and the coefficients a and b are determined.

The sum E of the square errors in the Z-direction within the entire block is given by:

$$E = \sum_k \{d_k - (ax_k + by_k + c0)\}^2$$

wherein $d_k$ is the value of a K-th pixel in the block, and $x_k$, $y_k$ are the x and y coordinates thereof.

By developing this equation and substituting the followings:

$$A = \sum_k x_k^2, B = \sum_k y_k^2, C = \sum_k (c0 - d_k)^2,$$

$$D = \sum_k (c0 - d_k)x_k, E = \sum_k (c0 - d_k)y_k, F = \sum_k x_k y_k$$

there is obtained:

$$E = Aa^2 + 2Da + Bb^2 + 2Eb + C + 2Fab$$

By solving this equation under the conditions:

$$\frac{\partial}{\partial a}E = 0, \frac{\partial}{\partial b}E = 0$$

there is obtained $$a = (BD - FE)/(F^2 - BA), b = (AE - FD)/(F^2 - BA)$$

since A, B and F are only related to the position in the block and do not vary according to k, a and b can be easily determined by measuring the values of C, D and E related to the pixel value $d_k$. The values a, b are clipped within a range of ±0.5, and thus clipped range is digitized into values 0–225. More specifically the values a', b' after digitization are given by:

$$a' = 128 + \text{floor}(128a + 0.5), b' = 128 + \text{floor}(128b + 0.5)$$

The prediction error $e_k$ is given by thus determined digital values a', b' in the following manner:

$$e_k = d_k - [\{x_k(a' - 128) + y_k(b' - 128)\}/256 + c0]$$

As explained in the foregoing, there can be determined the parameters a and b defining an optimum approximation plane, and the prediction error from this plane.

In the following there will be explained the method of encoding thus obtained prediction error.

The encoded data normally assume structures as shown in FIGS. 4A to 4D.

More specifically there are transmitted a Huffman code indicating the use of the "plane approximation mode" #6 for the encoding target block, codes indicating the values of a' and b' (fixed length codes), and a code c0 or c0' (representing the difference from the preceding encoding target block c0).

Then transmitted are data of a complete approximation flag, which indicates whether the prediction errors $e_k$ for the pixels within the encoding target block are all zero. If all zero, flag is turned on (1 in the present embodiment) and the data are terminated. If not, the flag is turned off (0 in the present embodiment), and then transmitted are the data, obtained by Huffman encoding of the prediction errors $e_k$, starting from $e_0$.

The Huffman table employed in the encoding of $e_k$ is selected same as that employed in the encoding methods #0–#5 and will be explained later in relation to steps S1 and S7 in FIG. 2.

The code c0 or c0' is selected according to the inclination parameters a', b'. A threshold value is set for each of a' and b'. In the present embodiment, this threshold is selected as 16, and c0' is adopted if a' and b', varying respectively in a range from 0 to 255) are both within a range 128±16 (a value 128 in the present embodiment corresponds to an inclination 0 in the ordinary graph), namely if both a' and b' have a small inclination, since c0' may become small in such case. c0 is adopted in other cases.

The code c0 is transmitted with a fixed length, but c0' is transmitted in the form of a Huffman code. The Huffman table used for c0' is fixed, and, in the present embodiment, is that shown in FIG. 4E.

In the following there will be explained the encoding method #7 of the "uniform" mode shown in FIG. 3B. This encoding method is used when all the data within the block have a same pixel value, and is effective in case the image has a frame or for the background of computer graphics.

The encoded data assume a form shown in FIG. 4B, in which transmitted are a Huffman code indicating the encoding method and a code c0' of the same property as that of c0' in the encoding method #6.

In the following there will be explained the encoding method #8 of the "binary" mode.

This encoding method is used when the encoding target block contains only two pixel values.

Among the two pixel values, the one corresponding to a higher luminance is defined as D1 while the other is defined as D2. The image is scanned as shown in FIG. 5A, under the assumption that the first pixel has a value D1, and the run lengths of D1 and D2, occurring alternately, are encoded.

Thus obtained run length is subjected to predetermined Huffman encoding. Each run length data is represented by 0 or a larger number of made-up codes and a terminating code.

The terminating code represents a run length from 0 to 127, and the make-up code represents a value equal to or larger than 128. These codes are encoded by respectively prepared Huffman tables.

The final run in a block is not encoded but is processed with the addition of an EOB code. In case D1 and D2 are for example white and black, there are respectively provided Huffman tables for white and black.

The present embodiment utilizes the 9 encoding methods explained above. The encoding methods within an image frame are determined by selecting an optimum one among such 9 encoding methods for each block of variable size, in the encoding process, to be explained later, of varying the size of the encoding target block.

In the following there will be given a detailed explanation on each of the steps in FIG. 2, showing the flow of the entire encoding process.

A step S1 sets a reference Huffman table, for each block size, to be used in the above-explained encoding methods #1–#6 in the process in a step S3.

A step S2 divides the image data, stored in the image memory 6, into base blocks of 128×128 pixels each, and latches the data of these base blocks in succession.

A step S3 tentatively determine the method of dividing the image data into the blocks (encoding target blocks) to be finally used in the encoding in a step S9, and the optimum encoding method (#0–#8) for each of thus divided blocks, as will be explained detailedly in the following.

The encoding target block (or the block dividing method) is tentatively determined, based on the comparison of the amount of codes generated by encoding of a square block and the total amount of codes generated by encoding four sub blocks formed by dividing the above-mentioned square block into four.

FIG. 6 shows a square block of a certain size and sub blocks thereof.

The square block of $2^n \times 2^n$ pixels is defined as B, and the sub blocks of $2^{n-1} \times 2^{n-1}$ pixels, obtained by dividing the above-mentioned square block, are defined as $b_0$–$b_3$.

A function Ci is defined for determining the amount of codes of the encoded data in case an encoding method #1 among the above-mentioned encoding methods #0–#8 is used for the square block B, and the obtained amount of codes is represented by $Ci(\beta)$.

Also a function BW for determining the minimum amount of codes among the amounts of codes encoded with such 9 encoding methods can be represented as:

$$BW(\beta) = \min(Ci(\beta))$$

Also a function MC, for determining the minimum amount of codes for the block of a certain size can be represented as follows, utilizing B and $b_i$ mentioned above:

$$MC(B) = \min\{BW(B) + HD\}, \sum_{i=0}^{3} MC(bi) + SF / BW(B) = \min(Ci(B))$$

In the present embodiment, as the minimum size of the sub block is defined as 4×4 pixels, there stand the foregoing equation and the following equation:

$$MC(B_{4 \times 4}) = BW(B_{4 \times 4}) = \min(Ci(B_{4 \times 4}))$$

In the foregoing equations, SF indicates the amount of data of a flag indicating the presence or absence of division into sub blocks. In the present embodiment, there is only required a 1-bit code, as there is only required the presence or absence of division of a block or a sub block. Consequently SF=1.

Also HD is the amount of information for representing i selected by the BW function, and, in the present embodiment, the information i is Huffman encoded by an exclusive Huffman table.

The tentative determination of the size of the encoding target block is conducted in the following manner.

Through the comparison of the amount of codes of a square block and the total amount of codes of the sub blocks thereof according to the foregoing equations, there is selected a block size providing the smaller amount of codes, and, if the sub blocks are selected, the selection of the block size is conducted for each of such sub blocks, in place of the above-mentioned square block. The amount of codes for each block is calculated with an encoding method best matching the block, among the nine encoding methods.

Figure 7:
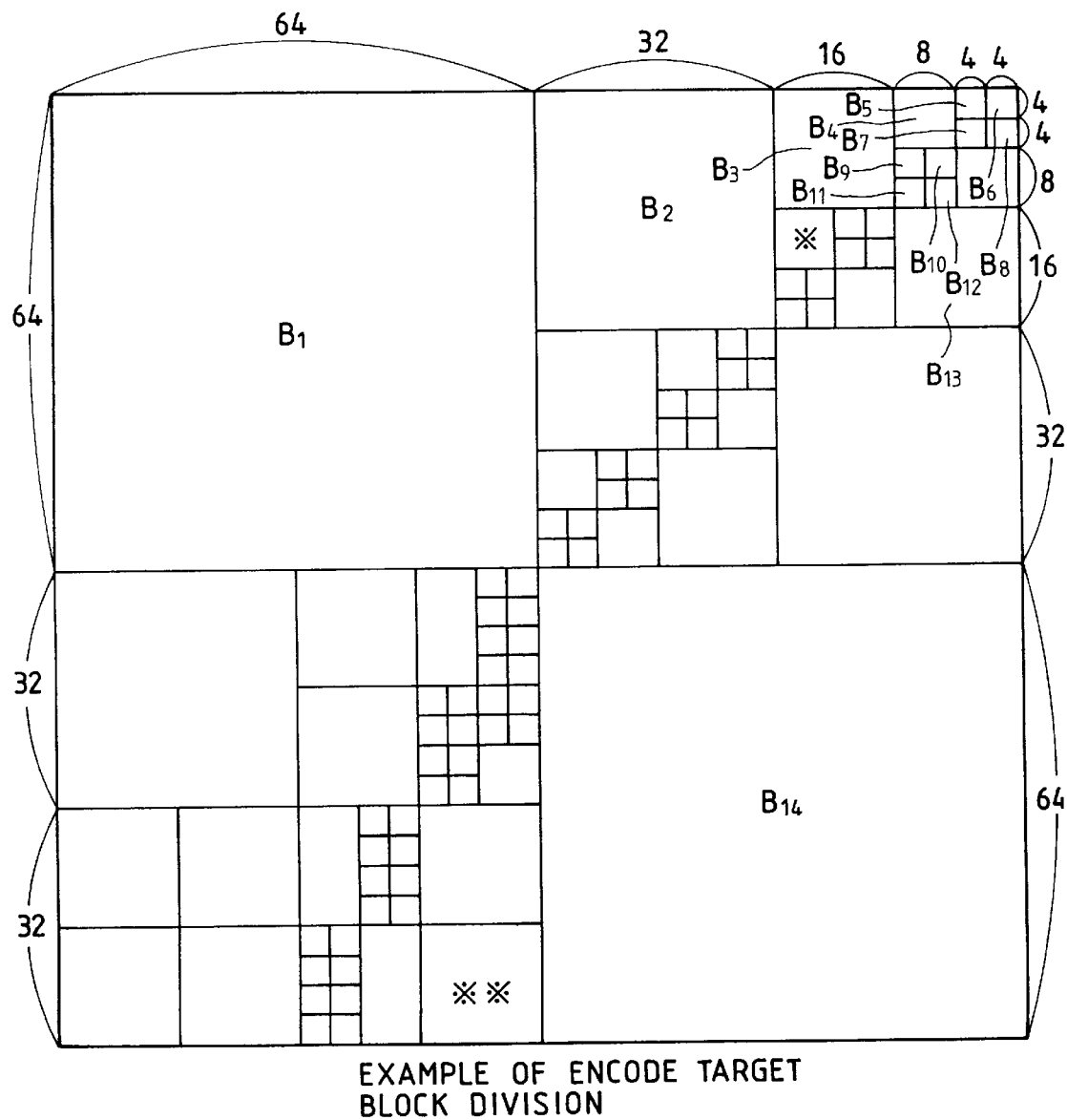
FIG. 7 is a view showing division of base blocks for determining the encoding target blocks.

FIG. 7 shows the block dividing method represented by the foregoing equations and the tentative determination of the encoding methods for thus divided blocks.

The example of block division shown in FIG. 7 is obtained by taking 128×128 pixels as the base block (maximum size of the encoding target block) and tentatively determining the encoding target blocks by progressive divisions of such base blocks.

The block division as shown in FIG. 7 occurs in case an edge crosses the block of 128×128 pixels from the upper right corner to the lower left corner. Each of the divided encoding target blocks has an independent encoding method (#0–#8).

Figure 8:
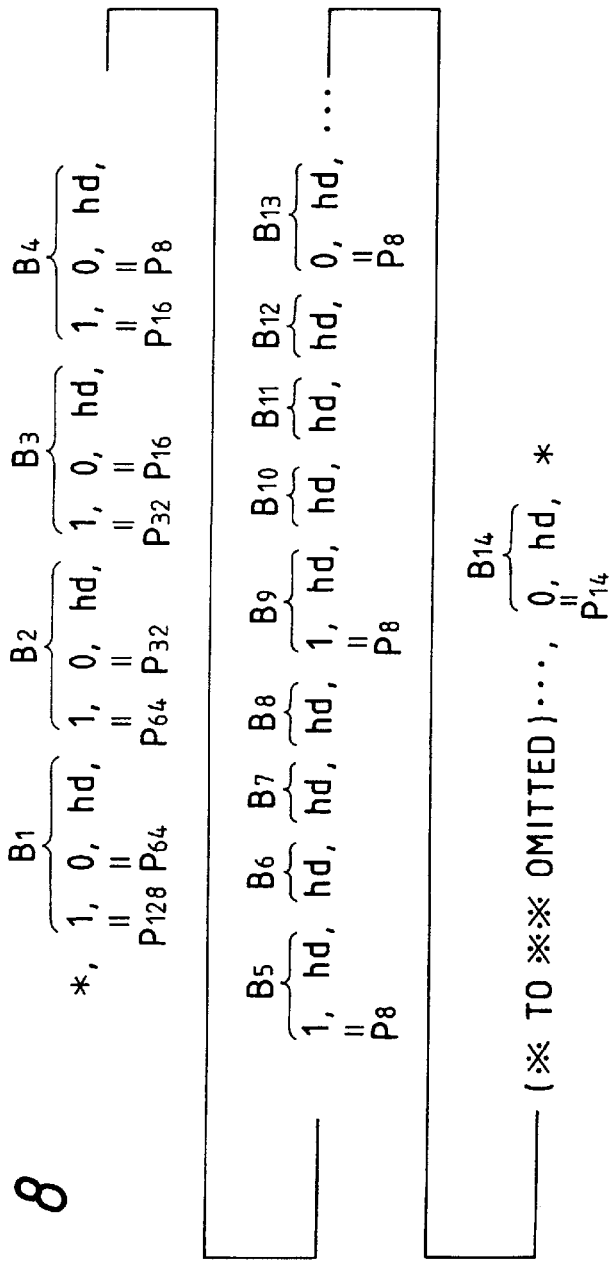
FIG. 8 is a view showing the format of block division information.

FIG. 8 shows a data format representing the block dividing method described according to the example of block division shown in FIG. 6 and the encoding methods respectively for such divided blocks (encoding target blocks).

Pn is 1-bit data corresponding to SF (presence or absence of block division) explained above. Pn=1 indicates the division of the block, but, if Pn=0, the block division is not conducted and there immediately follows the data indicating the encoding method (n indicating the block size to be processed).

As an example, ($P_{128}$=1), ($P_{64}$=1), ($P_{32}$=0) indicates (a block of 128×128 pixels being divided into 4), (an upper left block of 64×64 pixels being divided into 4), (an upper left block of 32×32 pixels being not divided), and a Huffman data hd (corresponding to HD mentioned above), representing the encoding method, is attached thereafter. Then follows ($P_{32}$=1), . . . .

Thus, Pn=1 is followed by the block division data $P_{n/2}$.

In FIG. 8, the block division data is not attached to the encoding target blocks $B_5$–$B_8$ and $B_9$–$B_{12}$ of the minimum block size, since such minimum block is no longer divided so that $P_4$ is always zero.

The block division data and the data indicating the encoding method are omitted in the encoding target blocks * to **.

A step S5 stores the block division data and the data indicating the encoding methods shown in FIG. 8.

A step S5 calculates, for the blocks to be tentatively encoded by the encoding methods #0–#6 among the encoding target blocks divided in the step S3 as shown in FIG. 7, the statistics of the difference (prediction error) generated in the encoding, for each block size.

For example, in FIG. 7, $B_1$ and $B_{14}$, or $B_4$ and $B_{13}$, or $B_5$–$B_8$ and $B_4$–$B_{12}$ have a same block size and are therefore collectively subjected to the calculation of the statistics, and the statistics of an image frame are thus stored.

In the present embodiment there are employed 6×511 counters in total, since 511 counters, from (prediction error −255 to 255, are required for each of the block sizes.

A step S6 discriminates whether the processing for the blocks of 128×128 pixels in the steps S2 to S5 have been completed for an image frame, and, if completed, the sequence proceeds to a step S7, but, if not, the sequence returns to the step S2 to proceed to the processing of the next block.

A step S7 prepares optimum Huffman tables for the respective block sizes, based on the six statistics obtained in the step S5.

A step S8 discriminates whether the loops of the optimization process of a predetermined number have been completed, and, if completed, the sequence proceeds to a step S9, but, if not, the sequence returns to the step S1 to replace the reference Huffman tables of the step S1 with those prepared in the step S7. This is because more efficient encoding is possible by repeating the block division for generating the encoding target blocks and the determination of the encoding methods, utilizing the optimum Huffman tables based on the target image instead of the reference Huffman tables.

If the step S8 identifies that the loops of the predetermined number have been completed, the block dividing method and the encoding methods determined in the last loop and the prepared optimum Huffman tables are stored as the reference information to be used in the final encoding, and the sequence proceeds to a step S9.

A step S9 effects encoding of the image based on the reference information and releases the encoded data.

FIG. 9 shows the flow of the encoding process in the step S9. In FIG. 9 there are shown a step S80 for encoding the optimum Huffman table; a step S81 for latching the block data of the size of the base blocks; a step S82 for latching the reference information corresponding to such block data; a step S83 for encoding the block data according to the reference information; and a step S84 for judging the image end.

At first a step S80 encodes the Huffman tables for a block of 128×128 pixels, a block of 64×64 pixels, a block of 32×32 pixels, a block of 16×16 pixels, a block of 8×8 pixels, and a block of 4×4 pixels.

A step S81 latches the block data of a size of the base block, in succession, from the image data.

A step S82 fetches the reference information corresponding to the block data. A step S83 encodes the reference information and the block data, according to the reference information to release a train of thus generated encoded data. A step S84 judges the end of the image, and, if any unprocessed block still exists, the process is repeated from the step S81 on the next block.

Figure 10:
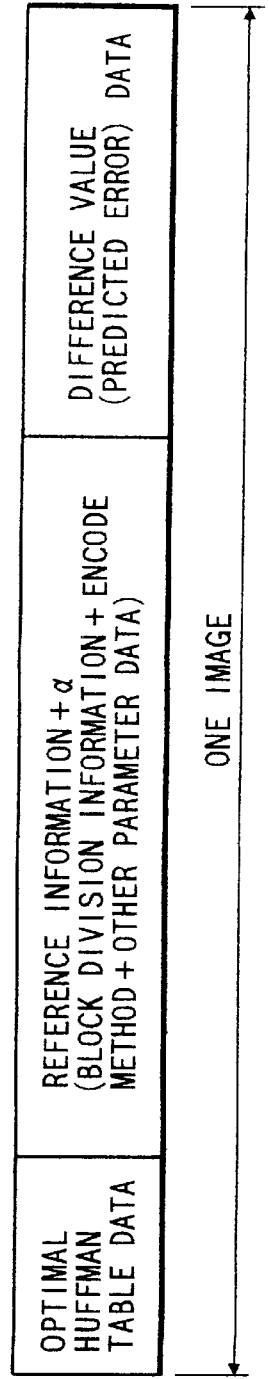
FIG. 10 is a view showing finally encoded image data.

Through the above-explained process, there are generated and released a train of encoded data as shown in FIG. 10, corresponding to the image data. The sequence of data may be in the unit of a block, instead of the unit of a pixel.

The block division explained in the foregoing first embodiment is conducted by dividing a block into four blocks of a same size, but the divided blocks may also have different sizes.

Also in the first embodiment, the encoding target block is determined by the block division, based on the amount of codes of a square block as shown in FIG. 6 and the total amount of the codes of four sub blocks obtained by division of the above-mentioned square block, but it is also possible to effect the block division by determining the amounts of codes on all the blocks from the maximum size (128×128 pixels) to the minimum size (4×4 pixels).

It is also possible to at first determine the amount of codes of a minimum block, which is regarded as a sub block, then to determine the tentative block dividing method and the amount of codes based on the total amount of codes of four sub blocks (4×4 pixels each) and a block of united area (8×8 pixels), further to determine the tentative block dividing method based on the total amount of codes of the four areas (8×8 pixels in total) and that of an even larger block (16×16 pixels) constructed from such areas, and to repeat such process until the largest block size of 128×128 pixels, thereby determining the encoding target block.

Also the prediction encoding, plane encoding and run-length encoding are made selectable for the encoding of the blocks, but it is naturally possible also to vary the method of application by a change in the predicting method, or to employ other encoding methods such as the Marcoff model encoding. Also in the foregoing embodiment, Huffman encoding is used as the entropy encoding in each of the encoding methods, but other entropy encoding methods such as Golomb-Rice encoding or arithmetic encoding may also be employed.

The block dividing method is determined according to the amount of codes, but it may also be determined according to the encoding efficiency which is obtained by effecting the actual encoding.

As explained in the foregoing, the first embodiment enables encoding with the optimum encoding methods in the optimum encoding units, according to the property of the image.

Also in the encoding operation in the unit of blocks, there can be achieved more efficient encoding than in the prior art.

Figure 11:
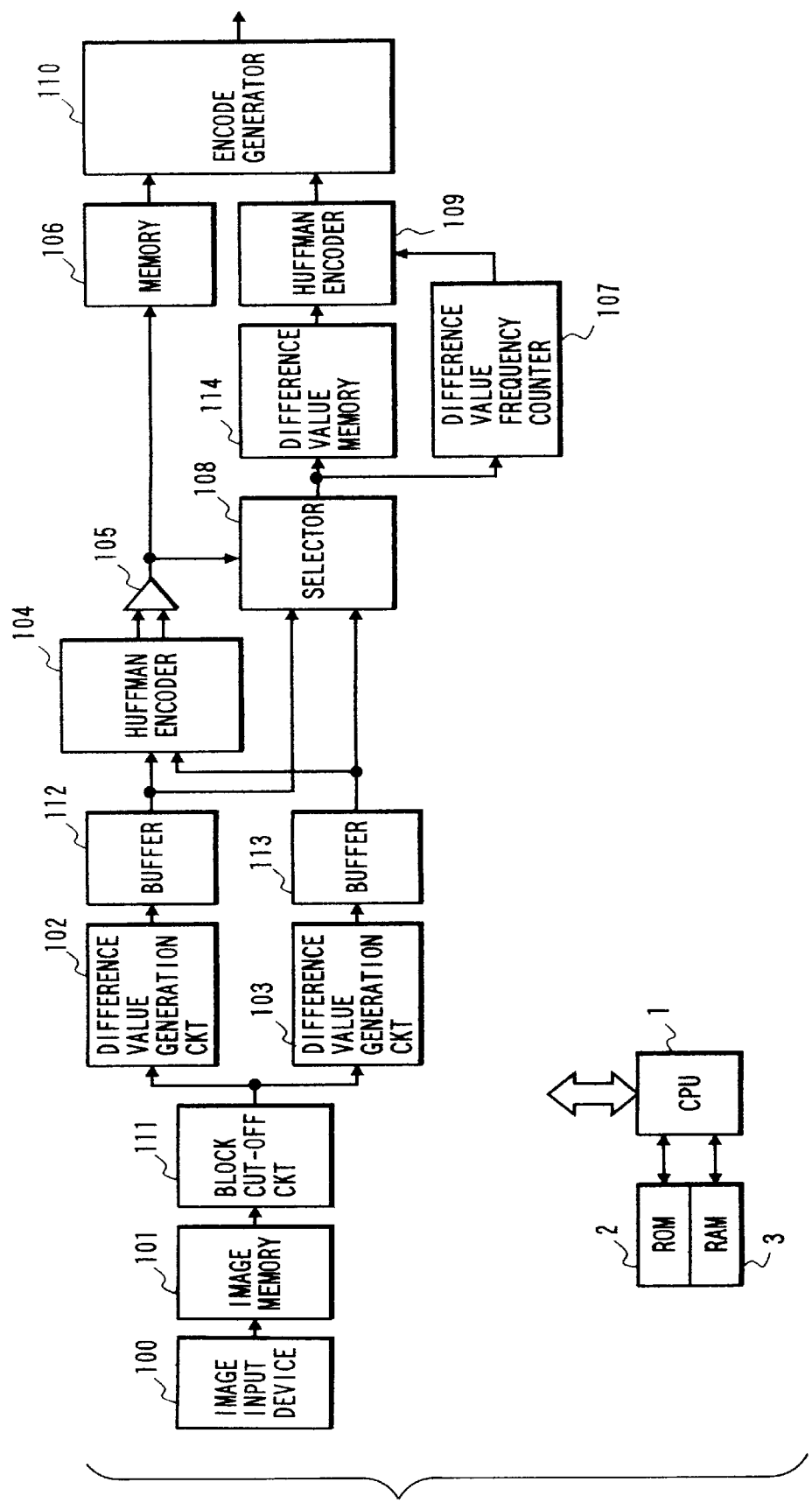
FIG. 11 is a block diagram of an encoding circuit of second and third embodiments.

FIG. 11 is a block diagram of an encoding apparatus constituting a second embodiment of the present invention, wherein shown are an image input device 100; an image memory 101; a block cut-out circuit 111; difference generating circuits 102, 103; buffers 112, 113; a Huffman encoding unit 104; a code amount comparator 105; a memory 106; a selector 108; a difference memory 114; a frequency counter 107; a Huffman encoding unit 109; and a code generator 110.

A CPU 1 controls the above-mentioned circuits, based on a program stored in a ROM and utilizing a RAM 3 as a work area.

In the following there will be given a detailed explanation on the encoding method for the image information, in the circuit shown in FIG. 11.

As an example, there will be explained the encoding of a monochromatic multi-value image of 8 bits (0 to 255). In the Huffman encoding circuit 104, there is set, in advance, a reference Huffman table, based on the statistics of prediction error. The frequency counter 107 counts the frequency of occurrence of the values from −255 to 255, the frequencies being initially set at 0.

Figure 12:
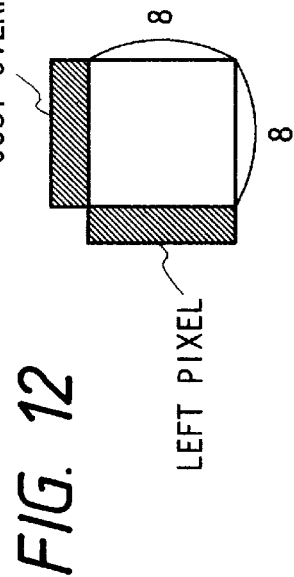
FIG. 12 is a view showing a pixel region cut out by a block cut-out circuit 111.

At first, image data entered from the image input device 100 are stored in the image memory 101. The block cut-out circuit 111 reads and stores the image data from the image memory 101, in the unit of a block of 8×8 pixels. In this operation, there are also read and stored the pixel data of 8 pixels positioned at the left and those at the top of the 8×8 block, as shown in FIG. 12. The difference generating circuit 102 generates, for each of the 8×8 pixels in the block, the difference from a pixel adjacent to the left, and stores thus generated 8×8 differences in the buffer 112. Similarly the difference generating circuit 103 generates, for each of the 8×8 pixels in the block, the difference from a pixel positioned thereon, and stores thus generated 8×8 differences in the buffer 113.

The Huffman encoder 104 effects Huffman encoding of the difference data trains stored in the buffers 112, 113 according to predetermined Huffman tables, for output to the respectively different signal lines. The code amount comparator 105 compares the amounts of codes of the two Huffman encoded data trains released from the Huffman encoder 104 by each block, and releases "0" in case the amount of the Huffman encoded data released from the difference generating circuit 102, or the amount of the Huffman encoded data of the block when the differences are calculated with the pixels at the left, is less than the other, or releases "1" in case the amount of the Huffman encoded data released from the difference generating circuit 103, or the amount of the Huffman encoded data of the block when the differences are calculated with the pixels positioned above.

The memory 106 stores the 1-bit output value released from the code amount comparator 105, in the unit of each block of 8×8 pixels.

The selector 108 releases the difference data train stored in the buffer 112 or 113 respectively if the output of the code amount comparator 105 is "0" or "1".

The difference frequency counter 107 counts the frequency of occurrence of each difference in the difference data train released from the selector 108.

The memory 114 stores, for the entire image frame, the difference data train in the units of block of 8×8 pixels, released from the selector 108.

After the process from the block cut-out circuit 114 to the difference memory 114 and the difference frequency counter 107 is completed for the entire image frame, the Huffman encoder 109 prepares a presumably optimum Huffman table, based on the statistics of the differences taken in the difference frequency counter 107.

In the present embodiment, the table is so prepared in such a manner that the Huffman codes of progressively increasing length are assigned in the order of decreasing frequency.

Then the difference data train of an image frame, stored in the memory 114, is Huffman encoded in the unit of a block of 8×8 pixels, based on the Huffman table prepared in the Huffman encoder 109.

Figure 13:
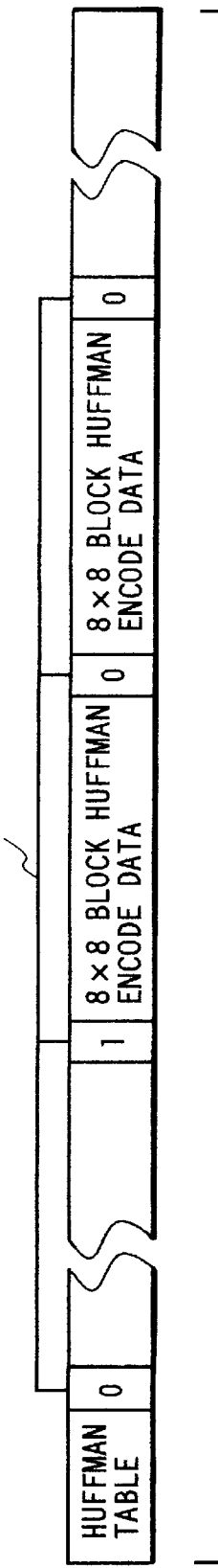
FIG. 13 is a view showing the encoded data format finally released from the block shown in FIG. 1, in the second embodiment.

As shown in FIG. 13, the code generator 110 adds, to the Huffman encoded data of each block of 8×8 pixels released from the Huffman encoder 109, 1-bit information (difference mode information) indicating the pixels on which the differences are calculated in the block, and releases such information in the unit of an image frame. In this operation, the Huffman table prepared in the difference frequency counter 107 is attached to each image frame, for use in the decoding operation.

In the embodiment explained above, the Huffman encoding may be replaced by other entropy encoding methods such as arithmetic encoding. Also the encoding may be conducted, instead of the difference between the pixels, on the run-lengths of the pixel values.

Also the block size may be 4×4, 16×16 or 32×32 pixels instead of 8×8 pixels.

The difference generating circuits 102, 103 employ two different difference generating methods, but such circuits may be so constructed as to utilize three or more difference generating methods.

Also the present embodiment has been explained in case of processing an 8-bit multi-value monochromatic image, but it is applicable also to a binary image or to a color image.

In the encoding operation of the second embodiment, the Huffman encoder 104 predicts, utilizing the reference Huffman table, whether the difference generating circuit 102 or 103 generates a smaller amount of codes, and the difference calculating mode, or the method of calculating the difference between the pixels, is determined according to the result of such prediction.

However, since the actual encoding operation utilizes a Huffman table different from the reference Huffman table prepared by the Huffman encoder 109, the difference mode determined in advance may not be optimum for reducing the amount of the encoded data.

Figure 14:
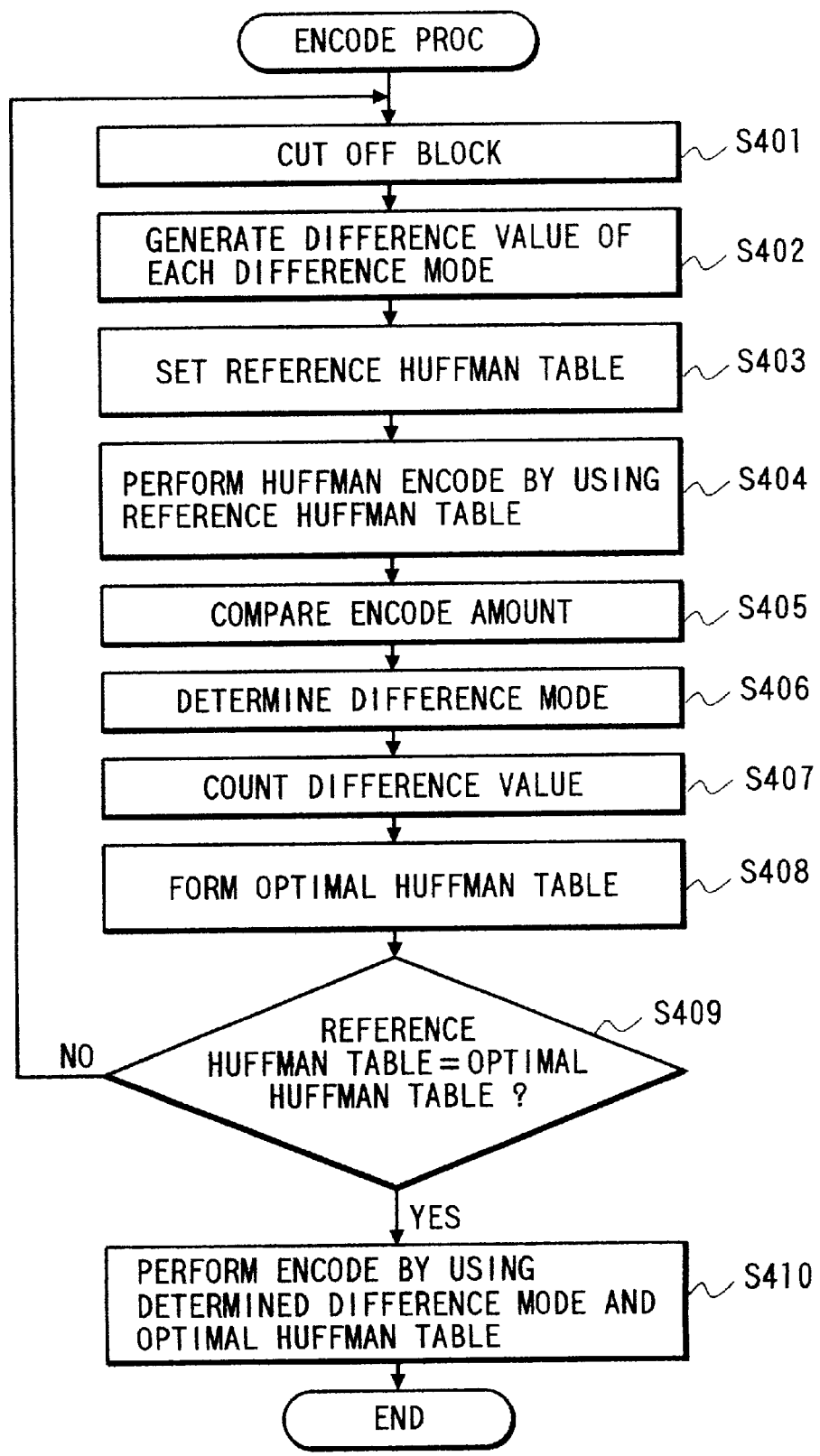
FIG. 14 is a flow chart showing an encoding sequence of the third embodiment.

FIG. 14 is a flow chart of a third embodiment, avoiding the above-mentioned drawback.

The circuit configuration is basically same as that in the second embodiment. In the following the third embodiment will be explained in detail, with reference to FIGS. 11 and 14.

Steps S401 and S402 execute the block cut-out and the generation of the difference data train in the same manner as in the first embodiment.

Then a step S403 prepares the reference Huffman table, for the first time, the Huffman table prepared in advance and same as that in the second embodiment is set as the reference Huffman table.

Then Huffman encoding is conducted with such reference Huffman table, and the code amounts of the Huffman encoded data trains are compared between the different difference modes (difference calculation with the pixel at the left, and that with the pixel above). Thus the difference mode is determined for each block of 8×8 pixels, and the result of determination is stored as 1-bit data in the memory 106 (S404–S406).

The selector 108 selects the difference data train according to the output of the code amount comparator 105, and thus released difference data train is stored, in the unit of a block of 8×8 pixels, in the difference memory 114.

The process up to this point is same as in the second embodiment.

In the third embodiment, when the optimum Huffman table is prepared by the Huffman encoder 109, it is compared, in a step S409, with the reference Huffman table employed by the Huffman encoder in the step S404.

Figure 15:
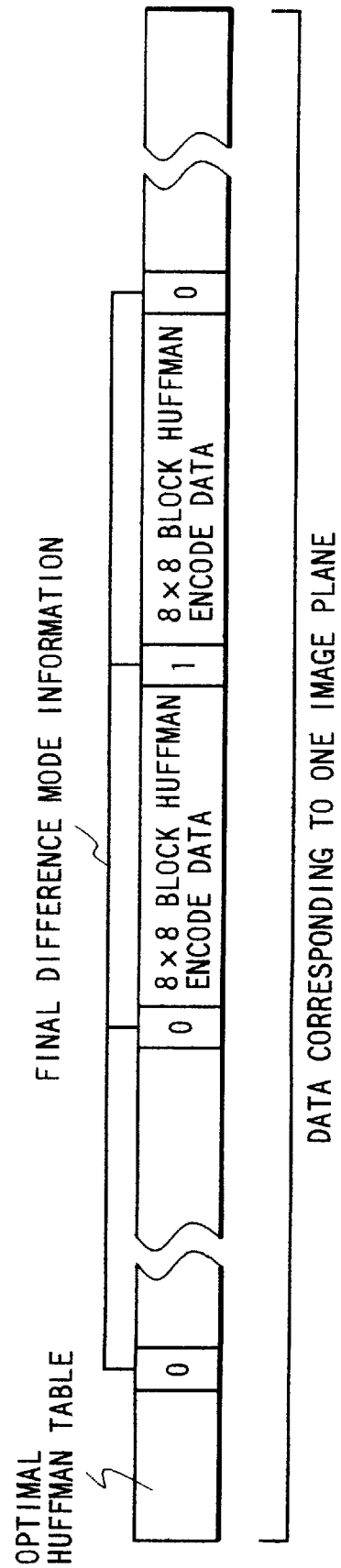
FIG. 15 is a view showing the encoded data format finally released from the block shown in FIG. 1, in the third embodiment.

If the comparison of the step S409 identifies that the two Huffman tables are same, the determination of the difference mode in the step S406 is based on the optimum Huffman table to be used in the final encoding consequently the encoding process thereafter is same as that in the first embodiment, and the encoded data are released from the code generator in the order shown in FIG. 15.

If the step S409 identifies that the two Huffman tables are mutually different, the CPU 1 stores the data of the optimum Huffman table, generated in the Huffman encoder 109, in the RAM 103, then resets the process from the block cut-out circuit to the code generator 104, and repeats the process of the steps S401 to S408, for preparing the optimum Huffman table.

This repeated process is different from the initial cycle in the setting of the reference Huffman table in the step S403. The second or subsequent process of the steps S401 to S408 employs the optimum Huffman table prepared in the step S403 of the preceding cycle (stored in the RAM 3) as the reference Huffman table.

This encoding process is conducted until the two Huffman tables (reference Huffman table and optimum Huffman table) mutually coincide at the preparation of the optimum Huffman table in the step S408. The process thereafter is same as that in the second embodiment.

The control may also be so designed that the sequence proceeds from the step S409 to S410 in case the process of the steps S401 to S408 is executed by a predetermined number of times or the Huffman table prepared in the step S408 satisfies a predetermined encoding efficiency, even if the two Huffman tables do not mutually coincide.

The Huffman tables employed in the first to third embodiments may be replaced by other entropy encoding tables, such as Golomb-Rice encoding tables.

In the second and third embodiments, in case of switching the encoding method for each block unit of the encoding target data, the actual entropy encoding method is determined after the determination of the efficient encoding method for each block, so that the entropy encoding can be executed in optimal manner, matching the encoding method for each block unit.

Also in the third embodiment, the entropy (Huffman) encoding table used as the reference is renewed to obtain the entropy encoding table, the encoding method for each block and the encoding efficiency, in the optimal manner.

The present invention is subject to various modifications within the scope and spirit of the appended claims.

What is claimed is:

1. An image processing apparatus comprising:
    first entropy encoding means for entropy encoding plural input encoding target data, using a first entropy encoding table, to provide respective data amounts of plural encoded data;
    comparison means for comparing the data amounts of plural encoded data with each other;
    selection means for selecting one of said plural input encoding target data according to a result of the comparison performed by said comparison means;
    producing means for producing a second entropy encoding table, according to a content of the input encoding target data selected by said selection means; and
    second entropy encoding means for entropy encoding the input encoding target data selected by said selection means, utilizing the second entropy encoding table, wherein prior to being entropy encoded by said second entropy encoding means, that input encoding target data is not entropy encoded by said first entropy encoding means.

2. An image processing apparatus according to claim 1, wherein said plural encoding target data are difference data based on the pixel values.

3. An image processing apparatus according to claim 1, wherein said plural encoding target data are data on differences between the pixel values, and said differences are generated from different corresponding pixels.

4. An image processing apparatus according to claim 1, wherein said entropy encoding performed by said first and second entropy encoding means is Huffman encoding.

5. An image processing apparatus according to claim 1, wherein said content of the encoding target data is a frequency of occurrence of a difference of difference data, and wherein said producing means produces the second entropy encoding table according to the frequency of occurrence.

6. An image processing method comprising the steps of:
    a first encoding step of entropy encoding plural input encoding target data, using a first entropy encoding table, to provide respective data amounts of plural encoded data;
    comparing the data amounts of plural encoded data with each other;
    selecting one of said plural input encoding target data according to a result of the comparing step;
    determining a second entropy encoding table, according to a content of the selected input encoding target data; and
    a second encoding step of entropy encoding the input encoding target data selected in the selecting step, utilizing the second entropy encoding table, wherein prior to being entropy encoded in the second encoding step, that input encoding target data is not entropy encoded in the first encoding step.

7. A data processing method comprising:
    a first encoding step of effecting entropy encoding of plural encoding target data with a first entropy encoding table to provide respective data amounts;
    a comparison step of comparing the respective data amounts of the plural encoding target data, encoded by said first encoding step, with each other;
    a determination step of selecting one of the plural encoding target data according to a result of said comparison step, calculating statistics of the selected encoding target data, and producing a second entropy encoding table based on the statistics;
    a second encoding step of effecting entropy encoding with the entropy encoding table; and
    a repetition step of repeating said first encoding step, said comparison step, and said determination step,
    wherein, in the execution of said repetition step, the second entropy encoding table produced by an execution of said determination step is employed as the first entropy encoding table in a next subsequent execution of said first encoding step.

8. A data processing method according to claim 7, wherein said repetition step is executed, in the production of the second entropy encoding table in said determination step, until the second entropy encoding table becomes equal to the first entropy encoding table.

9. A data processing method according to claim 7, wherein said repetition step is executed a predetermined number of times.

10. A data processing method according to claim 7, wherein said repetition step is executed until the second entropy encoding table satisfies a predetermined encoding efficiency.

11. An image data encoding method comprising:

a first generating step of generating an encoding target block from an input image;

a second generating step of generating plural sub-blocks from the encoding target block;

a first detecting step of selecting, from plural encoding methods, a first encoding method which, when used for encoding, minimizes a first code amount obtained by encoding the encoding target block taken as a whole and detecting the minimum first code amount;

a second detecting step of selecting, from plural encoding methods, a second encoding method which, when used for encoding, minimizes a second code amount obtained from encoding the encoding target block taken in the sub-blocks and detecting the minimum second code amount; and a determining step of determining whether the encoding target block is to be encoded taken as a whole or taken in the sub-blocks based upon a comparison of the minimum first code amount of said first detecting step and the minimum second code amount of said second detecting step.

12. A method according to claim 11, wherein the encoding target block is composed of $2^n \times 2^n$ pixel data and each of the sub-blocks is composed of $2^{n-1} \times 2^{n-1}$ pixel data.

13. A method according to claim 11, wherein when said determining step determines that the encoding target block is to be encoded taken in the sub-blocks, said second generating step and said second detecting step are re-executed for each of the sub-blocks taken a new encoding target block.

14. An image data encoding apparatus comprising:

first generating means for generating an encoding target block from an input image;

second generating means for generating plural sub-blocks from the encoding target block;

first detecting means for selecting, from plural encoding methods, a first encoding method which, when used for encoding, minimizes a first code amount obtained by encoding the encoding target block taken as a whole and detecting the minimum first code amount;

second detecting means for selecting, from plural encoding methods, a second encoding method which, when used for encoding, minimizes a second code amount obtained from encoding the encoding target block taken in the sub-blocks and detecting the minimum second code amount; and determining means for determining whether the encoding target block is to be encoded taken as a whole or taken in the sub-blocks based upon a comparison of the minimum first code amount of said first detecting means and the minimum second code amount of said second detecting means.

15. An apparatus according to claim 14, wherein the encoding target block is composed of $2^n \times 2^n$ pixel data and each of the sub-blocks is composed of $2^{n-1} \times 2^{n-1}$ pixel data.

16. An apparatus according to claim 14, wherein when said determining means determines that the encoding target block is to be encoded taken in the sub-blocks, said second generating means and said second detecting means re-execute their operations for each of the sub-blocks taken a new encoding target block.

17. An image data encoding method comprising:

a first generating step of generating an encoding target block from an input image;

a second generating step of generating plural sub-blocks from the encoding target block;

a first detecting step of selecting, from plural encoding methods, a first optimum encoding method which, when used for encoding, produces a first code amount obtained by encoding the encoding target block taken as a whole and detecting the first code amount;

a second detecting step of selecting, from plural encoding methods, a second optimum encoding method which, when used for encoding, produces a second code amount obtained from encoding the encoding target block taken in the sub-blocks and detecting the second code amount; and a determining step of determining whether the encoding target block is to be encoded taken as a whole or taken in the sub-blocks based upon a comparison of the first code amount of said first detecting step and the second code amount of said second detecting step.

18. An image data encoding apparatus comprising:

first generating means for generating an encoding target block from an input image;

second generating means for generating plural sub-blocks from the encoding target block;

first detecting means for selecting, from plural encoding methods, a first optimum encoding method which, when used for encoding, produces a first code amount obtained by encoding the encoding target block taken as a whole and detecting the first code amount;

second detecting means for selecting, from plural encoding methods, a second optimum encoding method which, when used for encoding, produces a second code amount obtained from encoding the encoding target block taken in the sub-blocks and detecting the second code amount; and determining means for determining whether the encoding target block is to be encoded taken as a whole or taken in the sub-blocks based upon a comparison of the first code amount of said first detecting means and the second code amount of said second detecting means.

* * * * *

UNITED STATES PATENT AND TRADEMARK OFFICE
CERTIFICATE OF CORRECTION

PATENT NO. : 6,101,282
DATED : August 8, 2000
INVENTOR(S) : YASUJI HIRABAYASHI ET AL.

Page 1 of 2

It is certified that error appears in the above-identified patent and that said Letters Patent is hereby corrected as shown below:

ON THE TITLE PAGE:

[56] References Cited, under OTHER PUBLICATIONS

After "M. Kunt et al.," "Block coding of graphics:" should read --Block Coding of Graphics:--; and Under *Attorney, Agent, or Firm-*

"Fitzpatrick Cella Harper & Scinto" should read --Fitzpatrick, Cella, Harper & Scinto--.

COLUMN 1:

Line 59, "Consequently" should read --Consequently,--.

COLUMN 5:

Line 55, "determine" should read --determines--.

COLUMN 9:

Line 4, "following" should read --following,--; and
Line 22, "Similarly" should read --Similarly,--.

COLUMN 10:

Line 38, "following" should read --following,--.

UNITED STATES PATENT AND TRADEMARK OFFICE
CERTIFICATE OF CORRECTION

PATENT NO. : 6,101,282
DATED : August 8, 2000
INVENTOR(S) : YASUJI HIRABAYASHI ET AL.

It is certified that error appears in the above-identified patent and that said Letters Patent is hereby corrected as shown below:

COLUMN 11:

Line 2, "encoding consequently" should read --encoding. Consequently,--.

COLUMN 13:

Line 31, "a" should read --as a--.

COLUMN 14:

Line 9, "a" should read --as a--.

Signed and Sealed this

First Day of May, 2001

Attest:

NICHOLAS P. GODICI

*Attesting Officer*  *Acting Director of the United States Patent and Trademark Office*